S. R. COOPER.
BALL RETAINER.
APPLICATION FILED AUG. 6, 1921.

1,412,453.

Patented Apr. 11, 1922.

Inventor,
Sidney R. Cooper,
By Lynnforth, Lee, Chritton & Wiles,
Attys.

UNITED STATES PATENT OFFICE.

SIDNEY R. COOPER, OF CHICAGO, ILLINOIS, ASSIGNOR TO U. S. BALL BEARING MANUFACTURING COMPANY, OF CHICAGO, ILLINOIS, A CORPORATION OF ILLINOIS.

BALL RETAINER.

1,412,453.     Specification of Letters Patent.     Patented Apr. 11, 1922.

Application filed August 6, 1921. Serial No. 490,301.

*To all whom it may concern:*

Be it known that I, SIDNEY R. COOPER, a citizen of the United States, residing at Chicago, in the county of Cook and State of Illinois, have invented a new and useful Improvement in Ball Retainers, of which the following is a specification.

This invention relates to ball bearings and particularly to ball retainers and is fully described in the following specification and shown in the accompanying drawings, in which—

Figure 1:
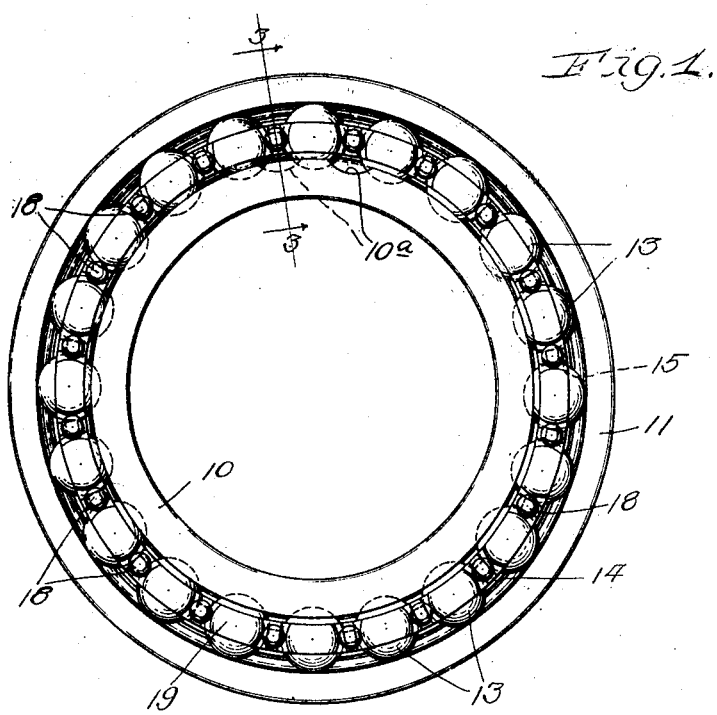
Figure 2:
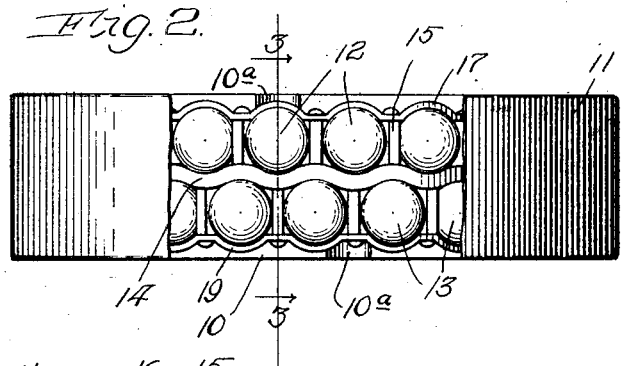
Figure 3:
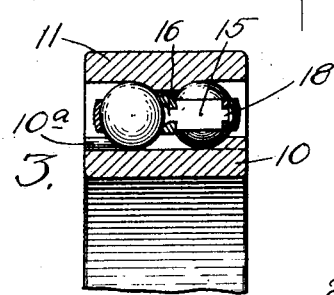

Figure 1 is a front elevation of a ball bearing embodying the invention; Figure 2 is a top view showing part of the outer race member broken away; and Figure 3 is a section on the line 3—3 of Figures 1 and 2. The invention is illustrated and embodied in a combined double row radial and thrust bearing having inner and outer race members 10 and 11, respectively, between which run two parallel sets of balls 12 and 13.

A ball retainer is provided for these consisting of a central member 14 which is reversely cupped on opposite sides to fit the balls of the two rows which are placed in staggered relation. A flat rivet 15 having a reduced end 16 is placed directly opposite the balls of one row and passes between the balls of the other row, the reduced end passing through a counter-sunk opening in the member 14 and being riveted over. These rivets are preferably assembled on the member 14 before it is inserted between the ball races and the balls are fed in a well-known manner between the ball races through suitable ball grooves 10ª as shown in Figures 1 and 3, the outer retaining members 17 having holes which fit over the reduced extensions 18 of the rivet 15.

The outer ends 18 are then riveted over while the balls of the opposite row serve to back up the member 14, the balls of this row being themselves backed up by any convenient kind of anvil or "dolly."

The opposite retaining member 19 is then assembled upon the rivets of its side in the same way, the balls of the opposite side again serving to back up the rivets while the operation of riveting is being performed.

While I have shown and described but a single embodiment of the invention, it is to be understood that it is capable of many modifications. Changes, therefore, in the construction and arrangement may be made which do not depart from the spirit and scope of the appended claims in which it is my intention to cover all novelty inherent in the invention as broadly as possible in view of the prior art.

I claim:

1. A ball bearing comprising inner and outer race members, two parallel sets of balls therebetween, a ball retainer having a member lying between said sets, rivets extending from opposite sides of said member in staggered relation and outer retaining members having holes through which the outer ends of the rivets pass whereby the balls of one set act as anvils for backing up the rivets of the opposite side which is being riveted.

2. A ball bearing comprising inner and outer race members, two parallel sets of balls therebetween, a ball retainer having a reversely cupped member lying between said sets, rivets extending from opposite sides of said member in staggered relation and outer retaining members having holes through which the outer ends of the rivets pass whereby the balls of one set act as anvils for backing up the rivets of the opposite side which is being riveted.

SIDNEY R. COOPER.